Dec. 17, 1957  R. W. STEPHENSON  2,816,923
CONVERSION OF MALEIC ACID TO FUMARIC ACID
Filed March 13, 1956
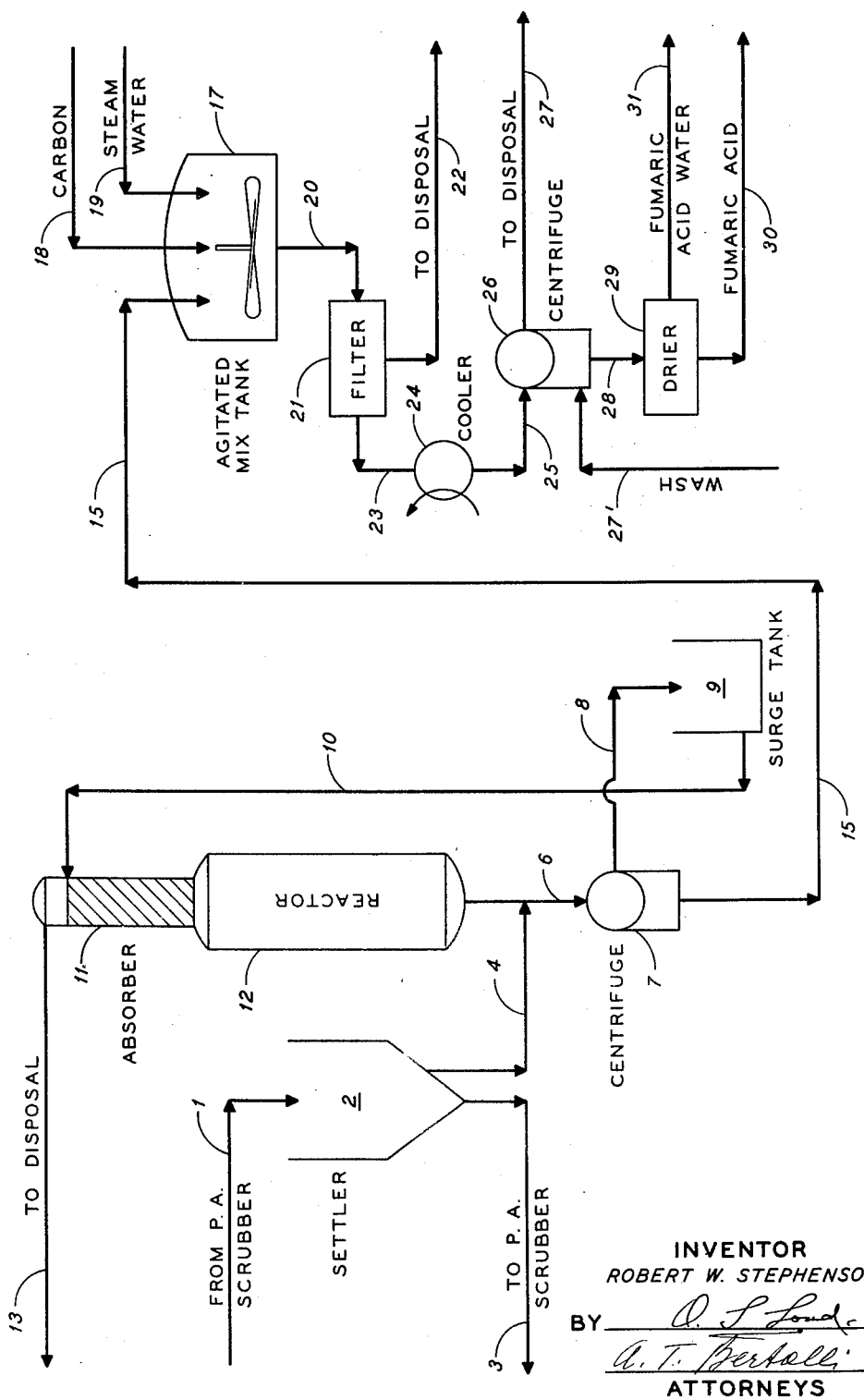
INVENTOR
ROBERT W. STEPHENSON
BY
ATTORNEYS United States Patent Office 2,816,923
Patented Dec. 17, 1957

2,816,923

CONVERSION OF MALEIC ACID TO FUMARIC ACID

Robert W. Stephenson, El Cerrito, Calif., assignor to California Research Corporation, San Francisco, Calif., a corporation of Delaware Application March 13, 1956, Serial No. 571,311

2 Claims. (Cl. 260—537)

This invention relates to a process for the production of fumaric acid. More particularly, the invention has to do with a process for the treatment of maleic acid liquors or solutions to convert the maleic acid into fumaric acid of a high purity in a high yield.

This application is a continuation-in-part of my co-pending application Serial No. 430,036, filed May 17, 1954.

Great quantities of maleic acid, together with certain organic impurities are found in the scrub liquors involved in the production of phthalic anhydride. These liquors can contain as much as 30 weight percent maleic acid, quantities of the order of 15 to 20 weight percent maleic acid in the scrub liquors being quite common. These liquors therefore represent a valuable source of raw material for the production of the more valuable fumaric acid isomer by conversion of the maleic acid into fumaric acid.

Attempts have heretofore been made to convert maleic acid into the more valuable fumaric acid isomer by processes including the catalytic action of acids, halogens and ultraviolet light. When an acid, such as hydrochloric acid, is employed, large amounts of acid are required, thus rendering the process expensive and occasioning undesirable corrosion problems. On the other hand, the use of ultraviolet light or a halogen, such as bromine, have been found to be substantially ineffective, probably because they are absorbed by other materials in the maleic acid liquor.

In accordance with the present invention, it has been found that the maleic acid content of liquors containing the same can be almost quantitatively converted to fumaric acid of a high degree of purity, i. e., of the order of 99 percent and better.

Broadly, the present invention contemplates a process for the production of fumaric acid from aqueous maleic acid liquors, particularly those resulting from the production of phthalic anhydride, involving the steps of heating in a reaction zone a maleic acid liquor to form a top vapor phase of maleic anhydride, and a bottom fraction of fumaric acid crystals in a maleic anhydride melt. The top vapor phase and water pass into an adsorption zone wherein the maleic anhydride is absorbed and the water is allowed to escape from the system. The bottom fraction is joined with fresh maleic acid feed as it issues from the reaction zone, and the resulting aqueous stream is introduced into a separation zone, wherein the fumaric acid crystals are separated and the liquid passed into the adsorption zone wherein the maleic anhydride is scrubbed from the vapors or absorbed by the liquid, the resulting mixture then going into the reaction zone. The separated fumaric acid crystals are then purified.

More specifically, a hot maleic acid liquor obtained from the production of phthalic anhydride and containing about 15 to 30 weight percent maleic acid, is cooled to precipitate the phthalic anhydride contained therein, i. e., to a temperature of about 80°–90° F., which may then be returned to the scrubber of the phthalic anhydride plant. The resulting cooled mother liquor then joins the fumaric acid crystals in the maleic anhydride melt issuing from the reactor, whereby a dilute aqueous slurry of fumaric crystals of a temperature within about the range of 120° F. to 140° F. is formed. This slurry is passed to a separation zone, wherein the fumaric acid crystals are separated from the liquid. The crystals are purified and the liquid passed into an absorption zone. In the absorption zone the vapors from the reaction zone maintained at a temperature of about 280° F. to 300° F. are scrubbed with the incoming liquid which absorbs the maleic anhydride formed in the reaction zone, and then enters the reaction zone, water being removed from the absorption zone and sent to disposal.

The invention will now further be described in connection with the drawing.

Referring to the drawing, mother liquor from the phthalic anhydride (P. A.) scrubber is introduced through line 1 into cooling vessel 2, which may be a flash cooler of cyclone separator. The maleic acid liquor is cooled at a temperature sufficiently low, i. e., 80° F.–90° F., to precipitate phthalic acid, which can then be returned to the scrubber via line 3. The resulting liquor from which the phthalic acid has been removed is withdrawn from the cooling vessel through line 4 and mixed with the slurry leaving the reactor through line 6. The solid fumaric crystals are separated as by means of centrifuge 7, and then further refined as hereinbelow described. The filtrate leaves the centrifuge through line 8, and is placed in surge tank 9, whence it may be pumped through line 10 to the top of packed column or absorber 11. As the filtrate drains through the tower it absorbs maleic anhydride vapors coming from reactor 12, and then drops in the reactor vessel. Water vapors leave the absorber through line 13. Temperatures in the reactor are maintained sufficiently high to evaporate water, that is, around 280° F. to 300° F., and may be operated at atmospheric or superatmospheric pressures. A slurry of fumaric acid crystals in an anhydrous maleic acid melt is continuously removed from the bottom of the reactor through line 6, and as hereinbefore indicated, joined with a stream of fresh maleic acid liquor feed, whereby the slurry is diluted and cooled to a temperature of about 120–140° F.

Crude fumaric acid, containing impurities, such as phthalic acid, is withdrawn from the separation zone through line 15, and is further treated to purify it. In a preferred embodiment of the invention, the purification treatment involves decolorization, recrystallization, and drying. Thus crude fumaric acid withdrawn from separation zone 7 through line 15 is sent to the decolorization zone. The decolorization zone comprises a tank or vessel 17 provided with means for agitation. Decolorizing agent, e. g., carbon, is introduced into the mix tank through line 18, an amount of about 1 to 2 percent carbon, based on the fumaric acid, being satisfactory. In mix tank 17 sufficient water and heat are employed to solubilize the fumaric acid, the higher the temperature the greater the solubility of the fumaric acid in the water, and hence the lesser amounts of water required to form the fumaric acid solution. Exceedingly high temperatures, however, are less desirably employed because of the adverse effect on ease of operation. On the other hand, exceedingly low temperatures require larger amounts of water, thus rendering the process bulky, and resulting in loss of product and a less pure product upon the subsequent recrystallization operation and the separation of the mother liquor from the fumaric acid crystals. In general, it is preferred to operate at a temperature of about 180° F. to about 210° F., employing from 10 to 12 parts by weight of water per part of fumaric acid, with the larger amounts of water being employed at the lower end of the temperature range, and lesser amounts of water at the higher temperatures. A convenient way of supplying the heat to the mix tank is by charging thereto part of the requisite water as steam, as illustrated through line 19.

Following the decolorization operation the hot fumaric acid solution is withdrawn from the mix tank 17 through line 20 and sent to filtering zone 21 to remove the carbon from the fumaric acid solution. Carbon is withdrawn through line 22, while the filtrate is withdrawn through line 23 and passed through cooling zone 24 to crytallize fumaric acid. A suitable cooling temperature is one which will effect crystallization of substantially all of the fumaric acid, allowing the impurities, e. g., phthalic acid, to remain dissolved in the mother liquor. Cooling temperatures of the order of 100° F. have been found satisfactory.

Following cooling the slurry of fumaric acid crystals is withdrawn from the cooling zone through line 25 and conducted to a separation zone, e. g., centrifuge 26, for the separation of fumaric acid crystals and mother liquor, the mother liquor being removed through line 27. Solid fumaric acid crystals are washed by means of water introduced into separation zone 26 through line 27'. The washed crystals are withdrawn through line 28 and introduced into drier 29, such as a drum drier. Dry fumaric acid is withdrawn from the drier through line 30, while fumaric acid water is withdrawn through line 31.

The following is an example of the practice of the invention in accordance with the procedure illustrated in the drawing.

A maleic acid stream is taken from the phthalic acid scrubber and cooled in the settler to a temperature of 90° F. This stream contains 3200 pounds water, 593 pounds of maleic acid and 150 pounds of phthalic acid. The sludge that forms in the settler is recycled to the scrubber. Leaving the settler is now a stream containing 3040 pounds water, 561 pounds maleic acid and 64 pounds phthalic acid. It joins the anhydrous stream leaving the reactor, this stream containing 720 pounds fumaric acid, 2414 pounds maleic acid and 168 pounds phthalic acid. Entering the centrifuge 7, is now a combined stream containing 170 pounds water, 528 pounds fumaric acid, 8 pounds maleic acid and 64 pounds of phthalic acid. The filtrate from centrifuge 7 and pumped to the top of absorber 13 contains 4550 pounds water, 192 pounds fumaric acid, 2967 pounds maleic acid and 168 pounds of phthalic acid. Leaving the absorber through line 13 are 4550 pounds of water.

The filter cake from centrifgue 7 is then treated with 30 pounds of decolorizing carbon and 6800 pounds of water at 200° F. After filtering off the carbon, centrifuging and drying of the cake there is obtained 460 pounds of highly pure fumaric acid.

Obviously many modifications and variations of the invention, as hereinbefore set forth, may be made without departing from the spirit and scope thereof and, therefore, only such limitations should be imposed as are indicated in the appended claims.

I claim:

1. Process for the preparation of fumaric acid crystals in a high yield and of high purity from maleic acid liquor, which comprises heating said maleic acid liquor in a reaction zone to form a top vapor phase of water and maleic anhydride passing into an absorption zone, and a bottom fraction of fumaric acid crystals, joining the bottom fraction issuing from the reaction zone with fresh maleic acid liquor, passing the resulting aqueous slurry into a separation zone to separate fumaric acid crystals from the liquid, passing the liquid into an absorption zone to absorb maleic anhydride, purifying and recovering the fumaric acid crystals.

2. A process for the production of fumaric acid from dilute aqueous solutions of maleic acid having a maleic acid content below about 30% by weight, which comprises maintaining a slurry of solid fumaric acid in hot concentrated maleic acid in a conversion zone, withdrawing vapors comprising maleic anhydride and steam from the upper portion of the conversion zone, withdrawing slurry from the lower portion of the conversion zone, cooling and diluting the withdrawn slurry with said dilute aqueous maleic acid, separating the diluted slurry to recover a solid phase comprising fumaric acid and a liquid phase, countercurrently contacting the liquid phase with the vapors withdrawn from the conversion zone in an absorption zone to simultaneously evaporate water from the liquid and absorb maleic anhydride in the liquid and hydrate it to maleic acid, withdrawing steam from the upper portion of the absorption zone, withdrawing liquid containing absorbed maleic anhydride from the lower portion of the absorption zone, and introducing it into the conversion zone.

References Cited in the file of this patent

UNITED STATES PATENTS

| | | |
|---|---|---|
| 2,208,519 | Spence et al. | July 16, 1940 |
| 2,704,296 | Dobratz | Mar. 15, 1955 |

OTHER REFERENCES

Tanatar: Berichte Deutsch. Chem. Gesell., vol. 23. Referate, p. 433 (1890).